(12) United States Patent  
Larcom et al.

(10) Patent No.: US 7,930,529 B2  
(45) Date of Patent: Apr. 19, 2011

(54) FAILOVER OF COMPUTING DEVICES ASSIGNED TO STORAGE-AREA NETWORK (SAN) STORAGE VOLUMES

(75) Inventors: Nichole L. Larcom, Bothell, WA (US); Bobby A. Stark, Snohomish, WA (US)

(73) Assignee: International Business Machines Corporation, Armonk, NY (US)

(*) Notice: Subject to any disclaimer, the term of this patent is extended or adjusted under 35 U.S.C. 154(b) by 1147 days.

(21) Appl. No.: 11/616,394

(22) Filed: Dec. 27, 2006

(65) Prior Publication Data

US 2008/0162913 A1    Jul. 3, 2008

(51) Int. Cl.  
*G06F 9/445* (2006.01)  
*G06F 15/177* (2006.01)  
*G06F 12/00* (2006.01)

(52) U.S. Cl. ............ 713/2; 713/1; 713/100; 711/100; 711/115; 711/170

(58) Field of Classification Search .............. 713/1, 2, 713/100; 711/100, 115, 170  
See application file for complete search history.

(56) References Cited

U.S. PATENT DOCUMENTS

| | | | |
|---|---|---|---|
| 6,782,416 B2 | 8/2004 | Cochran et al. | |
| 6,804,703 B1* | 10/2004 | Allen et al. | 709/216 |
| 6,990,573 B2* | 1/2006 | Cherian et al. | 713/1 |
| 7,028,125 B2 | 4/2006 | Lee et al. | |
| 7,444,502 B2* | 10/2008 | Hatasaki et al. | 713/1 |
| 7,549,076 B2* | 6/2009 | Hatasaki et al. | 714/3 |
| 2004/0078638 A1 | 4/2004 | Cochran | |
| 2005/0080887 A1 | 4/2005 | Lee et al. | |
| 2005/0080891 A1 | 4/2005 | Cauthron | |
| 2005/0207105 A1 | 9/2005 | Davies | |
| 2005/0257213 A1 | 11/2005 | Chu et al. | |
| 2008/0155243 A1* | 6/2008 | Diep et al. | 713/2 |

* cited by examiner

*Primary Examiner* — Thomas Lee  
*Assistant Examiner* — Fahmida Rahman  
(74) *Attorney, Agent, or Firm* — Thomas Tyson (57) ABSTRACT

In response to determining that a computing device to which one or more storage volumes within a storage-area network (SAN) have been assigned has satisfied a shutdown criterion, the storage volumes within the SAN are unassigned from the computing device. The storage volumes within the SAN are assigned to a cold-spare computing device, and the cold-spare computing device is booted from one of these storage volumes. Such computing device failover can be provided even where the computing devices are not clustered and even without employing virtualization.

15 Claims, 4 Drawing Sheets

FAILOVER OF COMPUTING DEVICES ASSIGNED TO STORAGE-AREA NETWORK (SAN) STORAGE VOLUMES

FIELD OF THE INVENTION

The present patent application relates generally to computing devices that are assigned to storage volumes within a storage-area network (SAN), and more particularly to the failover of such computing devices.

BACKGROUND OF THE INVENTION

Historically, computing devices were separately encased with their own enclosures, as is still common in single-office/home-office (SOHO) environments. However, supporting such computing devices within enterprise environments has been found to be prohibitively expensive. Therefore, more recently computing devices have begun to be collectively housed within chassis, as separate computing device "blades" that plug into the chassis.

Along with this development, another trend to reducing maintenance costs of computing devices is to house their storage devices in one more separate enclosures, such as within a storage-area network (SAN). Nearly all modern-day computing devices still need to be booted from a logical storage volume stored on a storage device, like a hard disk drive, and run application programs from and access data stored on such storage volumes. A logical storage volume is a logical collection of data organized over one or more storage devices, such as the storage devices within a SAN. A given computing device may be assigned to one or more storage volumes and boots from one of these storage volumes. In this way, the storage devices are not located within or on computing devices, but separately therefrom.

An issue with any type of computing device environment is that periodically computing devices fail, or periodically computing devices have to be shutdown for regular maintenance. In the most basic failover of one computing device to another, a computing device is manually shutdown and replaced with a cold-spare computing device, which is then booted to replace the shutdown computing device. However, such failover can require the intervention of information technology (IT) personnel, and therefore is costly in terms of the amount of time such personnel have to expend to perform the failover, as well as the length of downtime that is incurred before the cold-spare computing device can be booted to replace the shutdown computing device.

Different technologies have been developed to improve failover. One such technology is virtualization. In virtualization, what an end user views as a computing device is in actuality a virtual computing device that does not correspond to any particular physical computing device. A number of such virtual computing devices may be able to be run from a lesser number of physical computing devices. If a physical computing device has to be shutdown, the virtual computing devices that it hosts are simply migrated to another physical computing device before shutdown. Failover thus occurs relatively quickly, and with a minimum of downtime, if any.

Another such technology is clustering. In clustering, a number of computing devices are associated with one another as a cluster. One computing device within the cluster may be able to easily take over for another computing device within the cluster when the latter computing device has to be shutdown. As with virtualization, failover occurs relatively quickly, with a minimum of downtime, if any. Clustering and virtualization may further be employed together.

However, virtualization, clustering, and other such failover-oriented technologies are disadvantageous due to the presently high costs associated with these solutions. Both technologies can require costly hardware and/or software, as well as relatively sophisticated training for the IT personnel of an organization. Many organizations that would benefit from faster computing device failover cannot afford to modify their entire computing device topologies to take advantage of virtualization and/or clustering. For this and other reasons, therefore, there is a need for the present invention.

SUMMARY OF THE INVENTION

The present invention relates to the failover of computing devices assigned to storage-area network (SAN) storage volumes. A method of one embodiment of the invention determines that a computing device, to which one or more storage volumes within a SAN have been assigned, has satisfied a shutdown criterion. In response, the storage volumes within the SAN are unassigned from the computing device, and assigned to a cold-spare computing device. The cold-spare computing device is then booted from one of these storage volumes, such that the shutdown computing device effectively fails over to the cold-spare computing device, without human intervention.

A system of an embodiment of the invention includes a SAN, a number of computing devices, and management software. The SAN encompasses a number of storage devices, over which a number of volumes are logically organized. Each computing device is categorized as a running computing device or as a cold-spare computing device. Each running computing device is exclusively assigned to one or more of the storage volumes of the SAN, including a storage volume from which the running computing device is to boot. The management software is to monitor whether each of the running computing devices is to be shutdown. In response to determining that a running computing device is to be shutdown, the management software unassigns the storage volumes from the running computing device and reassigns them to one of the cold-spare computing devices. The management software then boots the cold-spare computing devices from one of these storage volumes.

An article of manufacture of an embodiment of the invention includes a tangible computer-readable medium and means in the medium. The tangible computer-readable medium may be a recordable data storage medium, or another type of computer-readable medium. The means is for determining that a computing device that has booted from a storage volume of a SAN is to be shutdown. The means is further for unassigning the storage volume from the computing device and for reassigning the storage volume to a cold-spare computing device. The means is also for booting the cold-spare computing device from this storage volume.

Embodiments of the invention provide for advantages over the prior art. Failover of a computing device that has been booted from a SAN storage volume to a cold-spare computing device is achieved without human intervention and automatically, such that failover occurs in a timely manner at a minimum of costly downtime. Furthermore, such failover is achieved without having to employ clustering and/or virtualization. As such, the failover afforded by embodiments of the invention is a cost-effective approach that can be utilized by organizations that cannot afford clustering or virtualization.

Still other aspects, embodiments, and advantages of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview

Figure 1:
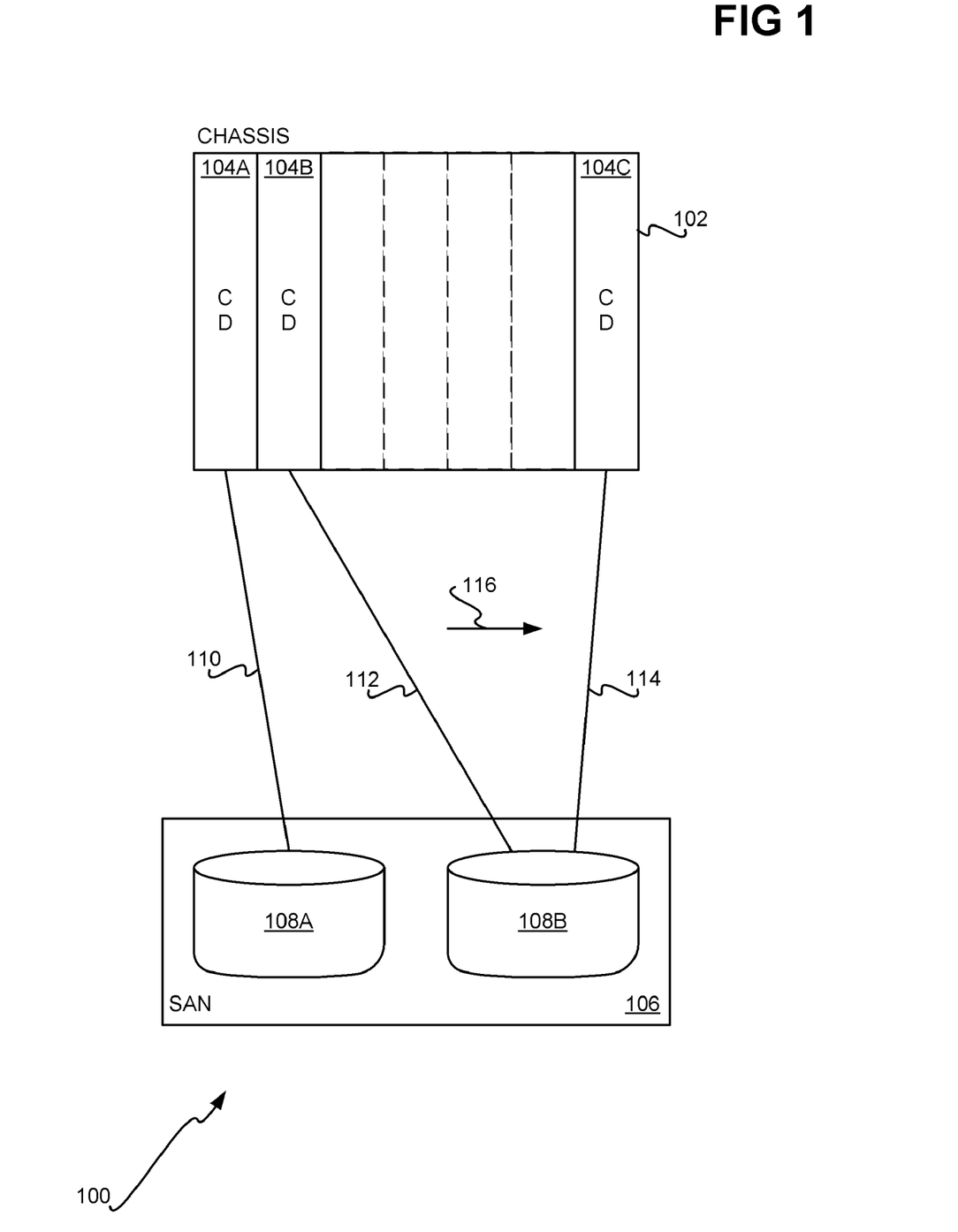
FIG. 1 is a diagram of a rudimentary system in conjunction with which computing device failover can be performed, according to an embodiment of the invention.

FIG. 1 shows a system 100, according to an embodiment of the invention. Operation of a general embodiment of the invention is described with reference to FIG. 1. In the next section of the detailed description, more specific details regarding a particular embodiment of the invention are provided. The system 100 includes a chassis 102 in which a number of computing devices 104A, 104B, and 104C, collectively referred to as the computing devices 104, have been inserted. The system 100 also includes a storage-area network (SAN) 106, encompassing the storage volumes 108A and 108B, collectively referred to as the storage volumes 108.

The chassis 102 is an enclosure that is capable of housing a number of computing devices 104 within slots of the chassis 102. The computing devices 104 in this embodiment of the invention are commonly known as blade computing devices. In another embodiment, there may be no chassis 102, such that each of the computing devices 104 are standalone computing devices, such as more typical desktop computing devices, as known within the art.

The computing devices 104 are each capable of running an instance of an operating system (OS) in a non-virtualized manner. That is, the OS instances do not run within virtual machines that are being executed on the computing devices 104, but rather are executed directly on the physical computing devices 104 themselves. The computing devices 104 are further not organizing in any type of clustering topology. It can be said that no cluster of the computing devices 104 is present, and that the computing devices 104 are not clustered.

However, the computing devices 104 do not run their OS instances from storage volumes logically organized on storage devices, such as hard disk drives, that are present on or within the computing devices 104 themselves. For instance, conventionally a computing device has one or more internal storage devices having one or more storage volumes from which an OS instance is run. Instead, all the computing devices 104 run their OS instances, as well as any data disks, from the storage volumes 108 of the SAN 106 (inclusive of those of the computing devices 104 that are running computing devices as those that are cold-spare computing devices, as will be described later in the detailed description).

The SAN 106 is a particular type of network that communicatively connects the storage volumes 108 as a single administrable resource. The SAN 106 typically communicatively connects to the chassis 102 via a single link (which may have redundancy, however), such as a fiber channel, which is not depicted in FIG. 1 for illustrative clarity. While different storage volumes 108 can be uniquely and individually assigned to different computing devices 104, the storage volumes 108 as a whole constitute a single network resource, the SAN 106.

The storage volumes 108 are logically organized collections of data. This data is actually stored on physical storage devices, such as hard disk drives, which are not specifically depicted in FIG. 1 for illustrative convenience. A given storage volume may have its data stored on one or more physical storage devices. Furthermore, multiple storage volumes can be stored on a single physical storage device. It can thus be said that the storage volumes 108 are logical volumes that are stored on physical storage devices. Embodiments of the invention are particularly concerned with logical storage volumes, such that the physical storage devices are not depicted in FIG. 1. Furthermore, the terminology "SAN storage volume" refers to a logical storage volume that is stored on one or more physical storage devices of the SAN 106.

In the example of FIG. 1, the computing devices 104A and 104B have been initially specified as what are referred to herein as running computing devices that are to actively execute OS instances. By comparison, the computing device 104C has been initially specified as a cold-spare computing device, which does not initially execute an OS instance. Rather, where one of the computing devices 104A and 104B has to be taken offline, shutdown, or is failing, the computing device 104C can take over for this computing device; that is, the computing device 104C can take over the storage volumes and the operating system instances formerly associated with the failing computing device.

There may be a different number of running computing devices than is depicted in FIG. 1, and there may be more than one cold-spare computing device, in contradistinction to the example of FIG. 1. The computing devices 104 may be organized over more than chassis 102 as well. For instance, all the running computing devices may be in one chassis, and all the cold-spare computing devices may be relegated to a separate chassis, as just one example.

A cold-spare computing device is in contrast to a hot-spare computing device. A hot-spare computing device is always on, and is able to immediately take over for another computing device that has to taken offline, shutdown, or is failing. Such a hot-spare computing device has already been booted, and therefore can immediately take over for another computing device. By comparison, a cold-spare computing device is not always on, and remains off until it is needed. When a cold-spare computing device is asked to take over for another computing device, the cold-spare computing device has to be booted up before it can take over for another computing device (after the storage volume associated with the failing computing device has been reassigned to the cold-spare computing device).

Each of the running computing devices 104A and 104B is initially uniquely assigned one or more of the storage volumes 108 of the SAN 106. In the example of FIG. 1, the storage volume 108A is assigned to the computing device 104A, as indicated by the line 110, and the storage volume 108B is assigned to the computing device 104B, as indicated by the line 112. The computing devices 104A and 104B each need at least one storage volume assigned to it in order to boot. Where just one storage volume is assigned to a running computing device, this storage volume is referred to as the boot storage volume, insofar as the running computing device boots from this storage volume and runs its OS instance from this storage volume. If more than one storage volume is assigned to a given computing device, the computing device may just run its OS instance from one storage volume, and use the other storage volume(s) for data or other purposes, for instance.

Therefore, in the example of FIG. 1, the storage volume 108A is the boot storage volume of the computing device 104A, as the only storage volume assigned to the computing device 104A, and the storage volume 108B is the boot storage volume of the computing device 104B, as the only storage volume assigned to the computing device 104B. As such, the computing device 104A boots from the storage volume 108A and executes its OS instance from the storage volume 108A. Likewise, the computing device 104B boots from the storage volume 108B and executes its OS instance from the storage volume 108B.

In the example of FIG. 1, at some point the computing device 104B needs to be shutdown, such as due to an impending failure of the computing device 104B, or due to regularly scheduled maintenance to be performed on the computing device 104B. Because the computing device 104B is a physical, and not a virtual, computing device, and because the computing device 104B is not clustered with the spare computing device 104C, there is no easy way conventionally to have the spare computing device 104C take over for the computing device 104B. However, an embodiment of the invention nevertheless provides for failover of the computing device 104B to the spare computing device 104C.

First, the storage volume 108B is unassigned from the computing device 104B that is to be shutdown. Second, the storage volume 108B is assigned to the cold-spare computing device 104C (as indicated by the line 114), as the boot storage volume for the computing device 104C, and the computing device 104C is booted from the storage volume 108B. This process is represented in FIG. 1 by the arrow 116.

Therefore, the storage belonging to the computing device 104B fails over to the cold-spare computing device 104C without human intervention, and with a minimum of downtime. The only downtime is the time it takes between initiating unassignment of the storage volume 108B and the complete boot of the cold-spare computing device 104C after it has been assigned the storage volume 108B. The OS instance that the computing device 104B had executed from the storage volume 108B is now executed by the computing device 104C, still from the storage volume 108B.

The embodiment of the invention described in relation to FIG. 1 thus leverages the fact that where a SAN 106 is being used to encompass the storage volumes 108 from which the computing devices 104 boot, failover among the computing devices 104 can be initiated by unassigning a given storage volume from one computing device, reassigning it to a cold-spare computing device, and then booting up the cold-spare computing device While this process may not be performed as quickly as when hot-spare failover is achieved, hot-spare failover typically requires clustering or virtualization. By comparison, the embodiment of the invention described in relation to FIG. 1 just needs a SAN 106, and otherwise does not need any special hardware or special software, beyond that which is already present to permit the computing devices 104 to use the storage volumes 108 of the SAN 106.

Figure 2:
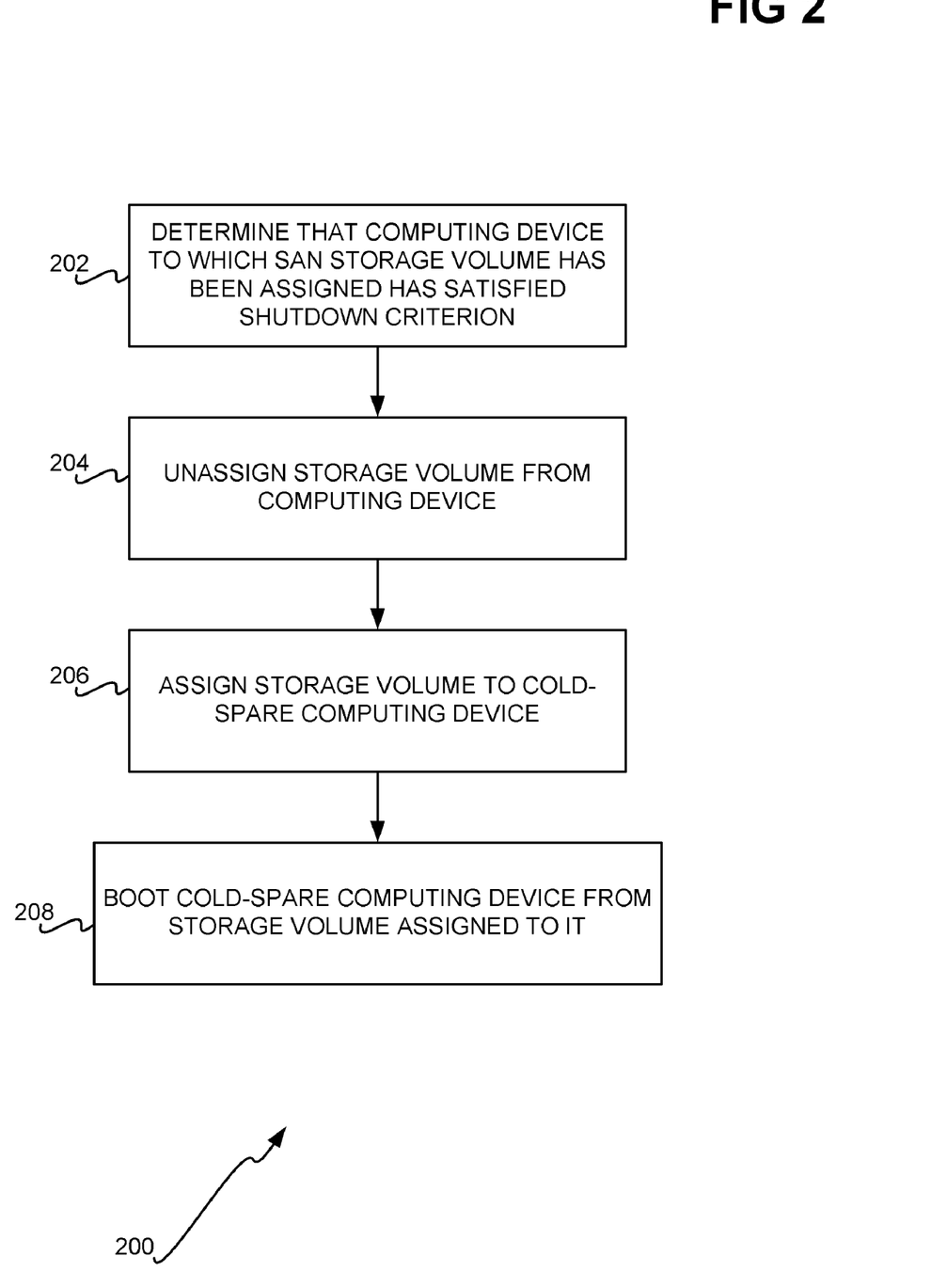
FIG. 2 is a flowchart of a rudimentary method for performing computing device failover, according to an embodiment of the invention.

FIG. 2 shows a method 200 that summarizes the process for failing over a computing device that has been described in relation to FIG. 1, according to an embodiment of the invention. It is determined that a computing device to which a SAN storage volume has been assigned has satisfied a shutdown criterion (202). For example, an event may have been generated indicating impending failure of the computing device. As another example, a user may have initiated the event, to signal that the computing device is to be shutdown for the performance of regular maintenance on the computing device.

The SAN storage volume is unassigned from the computing device (204), and assigned to a cold-spare computing device (206). The cold-spare computing device is initially off at this time. Thereafter, the cold-spare computing device is booted up (208), where the booting process occurs from the SAN storage volume assigned to the cold-spare computing device. That is, the cold-spare computing device loads and executes its OS instance from the SAN storage volume in question.

DETAILED EMBODIMENT AND CONCLUSION

Figure 3:
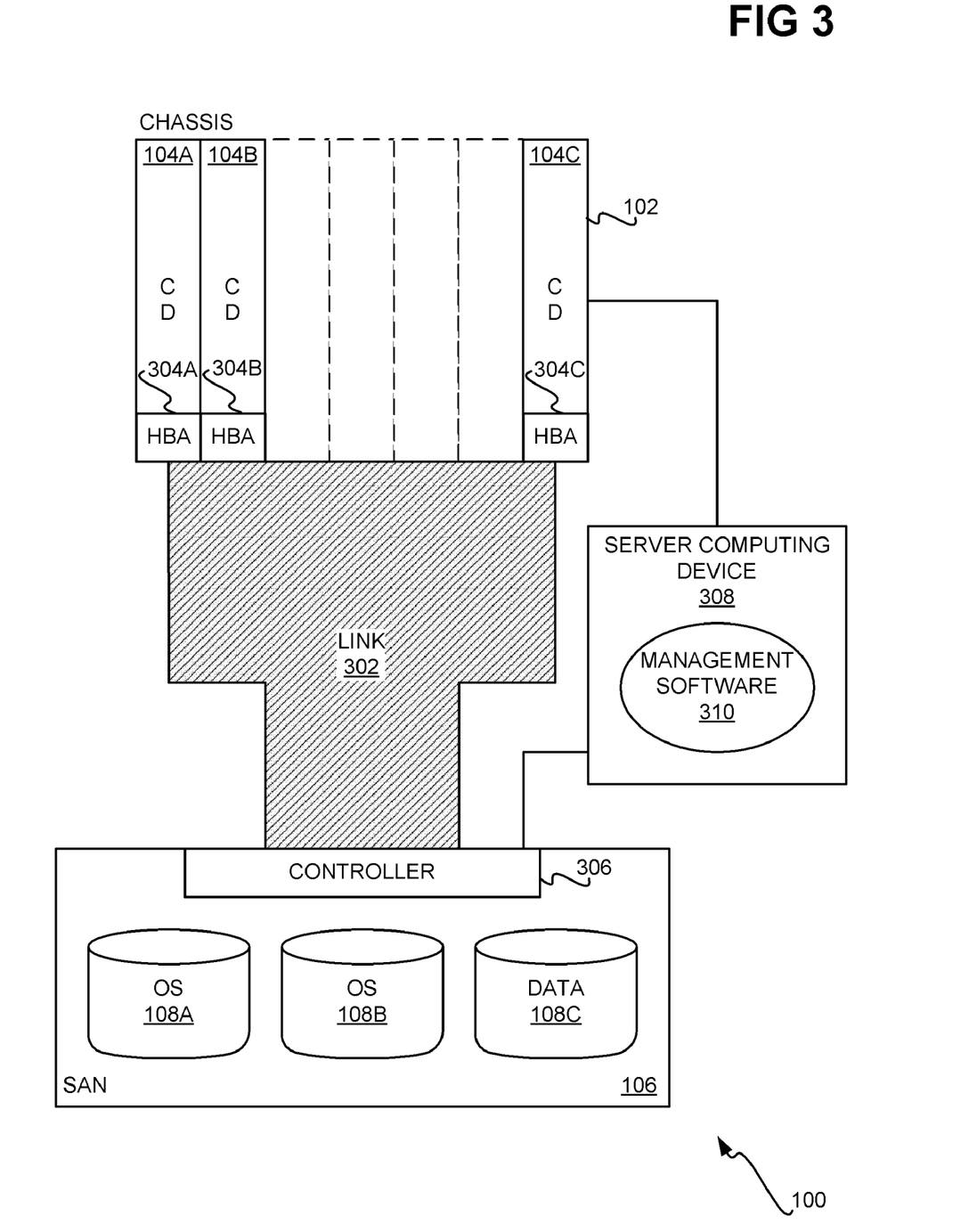
FIG. 3 is a diagram of a system in conjunction with which computing device failover can be performed and that is more detailed than but consistent with the system of FIG. 1, according to an embodiment of the invention.

FIG. 3 shows the system 100 in a manner that is more detailed than, but is consistent with, FIG. 1, according to an embodiment of the invention. The system 100 again includes a chassis 102 having three computing devices 104, and a SAN 106, which now is depicted as including a storage volume 108C in addition to the storage volumes 108A and 108B. The storage volumes 108A, 108B, and 108C are collectively referred to as the storage volumes 108.

A link 302 is depicted between the chassis 102 and the SAN 106, which may be a fiber channel, or another type of link. All communications between the computing devices 104 and the storage volumes 108 travel via the link 302. The computing devices 102 include host-bus adapters (HBA's) 304A, 304B, and 304C, respectively, which are collectively referred to as the HBA's 304.

The HBA's 304 are more generally network adapters. The HBA's 304 are the manner by which communication between the computing devices 104 and the SAN 106 over the link 302 is achieved. The connection between the computing devices 104 and the SAN 106 can be established in a number of different ways, such as fiber optic-based and/or copper (e.g., Ethernet)-based. Where the connection is fiber optic-based, the HBA's 304 are referred to as fiber channel HBA's. Where the connection is copper-based, the HBA's 304 are commonly referred to as iSCSI HBA's. It can be said that the HBA's 304 (or, more generally, the network adapters) communicatively couple the computing devices 104 to the SAN 106. It is also noted that the computing devices 102 typically include other components, in addition to the HBA's 304, such as processors, memory, chipsets, and so on, which are not depicted in FIG. 3 for illustrative clarity.

The SAN 106 includes a controller 306. Among other functions, which are described in more detail later in the detailed description, the controller 306 is the manner by which the storage volumes 108 of the SAN 106 communicate with the computing devices 104 over the link 302. The controller 306 further maintains the assignments of the computing devices 104 to the storage volumes 108. Thus, when a computing device is assigned to or unassigned from a storage volume, this assignment or unassignment takes place within the controller 306.

The system 100 of FIG. 3 further includes a server computing device 308 that is communicatively coupled with both the computing devices 104 of the chassis 102 and the SAN 106. As depicted in the example of FIG. 3, the server computing device 308 is not a blade computing device inserted into the chassis 102, although in a different embodiment it can be. Likewise, the server computing device 308 is depicted as being communicatively coupled with the chassis 102 and the SAN 106 in a manner other than the link 302, such as by a different type of network or other connection, although in a different embodiment it can be. The server computing device 308 has management software 310 running thereon, the functionality of which is described in detail later in the detailed description.

An administrator initially determines which of the computing devices 104 will be running computing devices, and which will be cold-spare computing devices. As in the example of FIG. 1, in FIG. 3, it is presumed that the computing devices 104A and 104B are running computing devices, and that the computing device 104C is a cold-spare computing device. The administrator, via the management software 310 running on the server computer device 308 or in another way, initially assigns the storage volumes 108 of the SAN 106 to the running computing devices. The management software 310 communicates this assignment to the controller 306 of the SAN 106, which stores the information. For each running computing device, at least one of the storage volumes 108 have to be assigned, since each computing device needs a storage volume from which to boot.

Each of the storage volumes 108 has a logical-unit number (LUN), which effectively is an identifier that uniquely identifies the storage volume. The assignment of the storage volumes 108 to the computing devices 104 may therefore be achieved by matching the LUN number(s) to an HBA. The storage volume from which a computing device is to boot is referred to as the boot LUN, and is commonly referred to as LUN0. The boot LUN, or LUN0, for a running computing device is thus the LUN of one of the storage volumes 108 that stores an OS instance. Furthermore, the cold-spare computing device 104C is specified to know that it should look for at least a boot LUN, or LUN0, initially; however, none of the LUN's of the particular devices 108 of the SAN 106 are assigned to the cold-spare computing device 104C.

Therefore, in the example of FIG. 3, the administrator, via the management software 310 or in another way, may initially assign the storage volume 108A to the computing device 104A, by assigning a LUN from the storage volume 108A as the boot LUN for the computing device 104A. The storage volume 108A stores an OS instance, such that the computing device 104A can boot from the storage volume 108A. The administrator may further assign the storage volume 108B to the computing device 104B, by assigning the LUN of the storage volume 108B as the boot LUN for the computing device 104B. The storage volume 108B also stores an OS instance, such that the computing device 104B can boot from the storage volume 108B.

The administrator may assign the other storage volume 108C as an additional LUN for the computing device 104B, as a storage volume, for instance, that stores data to be accessed by the computing device 104B. The cold-spare computing device 104C is not initially assigned an actual LUN of any of the storage volumes 108, but it is programmed with the information that its boot storage volume is at LUN0, the actual assignment of which will be provided later when the cold-spare computing device 104C is to take over for another computing device. Once the assignments have been made, they are stored in one or more of two places.

First, the controller 306 of the SAN 106 itself, stores a map that associates each LUN for each computing device with an actual LUN of one of the storage volumes 108. For example, the computing device 104A may boot up, and know that its boot storage drive is identified LUN0, or the boot LUN. This information is passed to the controller 306 of the SAN 106. The controller 306 of the SAN 106 looks up the identity of the computing device 104A—by, for instance, the address of the HBA 304A of the computing device 104A—to learn that the LUN0 for the computing device 104A is actually the LUN of the storage volume 108A. It therefore can be said that it is the controller 306 that actually associates and unassociates the storage volumes 108 to and from the computing devices 104, in response to instruction from the management software 310.

Second, the computing devices 104 themselves store LUN assignments, but in a more limited manner. More specifically, the HBA's 304 of the computing devices 104 store in their firmware the number of LUN's that they have available to them, and which LUN is the boot LUN. For example, with respect to the computing device 104B, the HBA 304B may store two LUN's: a LUN0, which is the boot LUN, and which is needed to boot the computing device 104B; and, a LUN1, which is an additional, non-boot LUN. The firmware within the HBA's 304 do not have the actual assignments of which storage volumes 108 correspond to their LUN's; that information is stored in the controller 306 of the SAN 106 itself.

However, the firmware within the HBA's 304 do store the number of LUN's—that is, the number of storage volumes—that they are expecting to be able to access after being booted, and from which LUN—that is, from which storage volume—from which they are to boot. Thus, the firmware within the HBA 304B stores a LUN0 and a LUN1, the former being denoted as the boot LUN, and the latter being denoted as a non-boot LUN. However, the firmware within the HBA 304B does not know that the storage volume 108B will be its particular boot LUN, for instance, nor that the storage volume 108C will be its particular LUN1.

Therefore, when a computing device boots up, the controller 306 of the SAN 106 identifies that the computing device does know the particular LUN(s) of the particular storage volume(s) that are to serve as the computing device's LUN0, LUN1, and so on. At that time, the controller 306 assigns the computing device with the LUN(s) of the particular storage volume(s), based on the assignment previously specified by the administrator. Thus, in the case of the computing device 104A, for example, upon being turned on, the device 104A requests that the controller 306 provide it with the identity, or LUN number, of the storage volume that is to serve as the computing device 104A's LUN0, and at that time, the controller 306 identifies the LUN of the storage volume 108A to the computing device 104A. However, the assignment of the computing device 104A to the storage volume 108A was previously accomplished via the administrator, as stored in the map maintained at the controller 306.

During normal operation, then, in the example of FIG. 3, the computing device 104A has assigned to it the storage volume 108A, and the computing device 104B has assigned to it the storage volumes 108B and 108C. The computing device 104A boots from the storage volume 108A. Likewise, the computing device 104B boots from the storage volume 108B, but is also able to access the data stored on the storage volume 108C. At some point, one of the computing devices 104A and 104B may have to be shutdown, due to detected impending failure of the computing device, for regular maintenance to be performed on the computing device, or for another reason.

In particular, agent software running on the computing devices 104 may regularly report their health status, as known within the art. If the health of a given computing device is not within specification, the management software 310 is provided with an event identifying the computing device in question as potentially failing. In this way, it can be said that the management software 310 effectively monitors whether a given running computing device is to be shutdown. The management software 310 then can run a script in one embodiment which fails over the computing device to the cold-spare computing device 104C. The administrator may also be contacted to inform him or her of the failover. An administrator may also manually fire an event so that a computing device fails over to the cold-spare computing device 104C, so that the computing device can be shutdown without undue interruption to the end user of this device.

As a first example, it is assumed that the computing device 104A is failing. Agent software running on the computing device 104A may report this information, such that ultimately an event is fired to the management software 310. In response to this event, the management software 310 performs a failover script. The failover script instructs the computing device 104A to shutdown, and instructs the controller 306 to unassign the storage volume 108A from the computing device 104A. The failover script next instructs the controller 306 to associate, or assign, the LUN of this storage volume 108A as the boot LUN, or LUN0, of the cold-spare computing device 104C.

The failover script finally powers on the computing device 104C. Upon power-on, the computing device 104C, via the HBA 304C, determines via the controller 306 how many LUN's have been assigned to it, and asks the controller 306 of the SAN 106 for the actual LUN of the storage volume that is to serve as the LUN0 for the computing device 104C. The controller 306 returns the information that storage volume 108A is the LUN0 for the computing device 104C. As such, the computing device 104C can boot from the storage volume 108A, and therefore serve as the failover for the computing device 104A.

As a second example, it is assumed that the computing device 104B, instead of the computing device 104A, is failing. Agent software running on the computing device 104B may report this information, such that the management software 310 is eventually notified. In response, the management software 310 performs the failover script. The script instructs the computing device 104B to shutdown, and instructs the controller 306 to unassign the storage volumes 108B and 108C from the computing device 104B. The failover script then instructs the controller 306 to associate, or assign, the LUN of the storage volume 108B as the LUN0 of the cold-spare computing device 104C, and to associate, or assign, the LUN of this storage volume 108B as the boot LUN, or LUN0, of the computing device 104C. Likewise, the failover script instructs the controller to assign the LUN of the storage volume 108C as a second, LUN1 for the cold-spare computing device 104C.

Upon power-on, the computing device 104C, via the HBA 304C, determines how many LUN's are to be assigned to it (via the controller 306), and asks the controller 306 for the actual LUN numbers of the storage volumes that are to serve as the LUN0 and as the LUN1 for the computing device 104C. The controller 306 returns the information that the LUN of the storage volume 108B is the LUN0 for the computing device 104C, and that the LUN of the storage volume 108C is the LUN1 for the computing device 104C. The computing device 104C then boots from the storage volume 108B, and thus serves as the failover for the computing device 104B.

Figure 4:
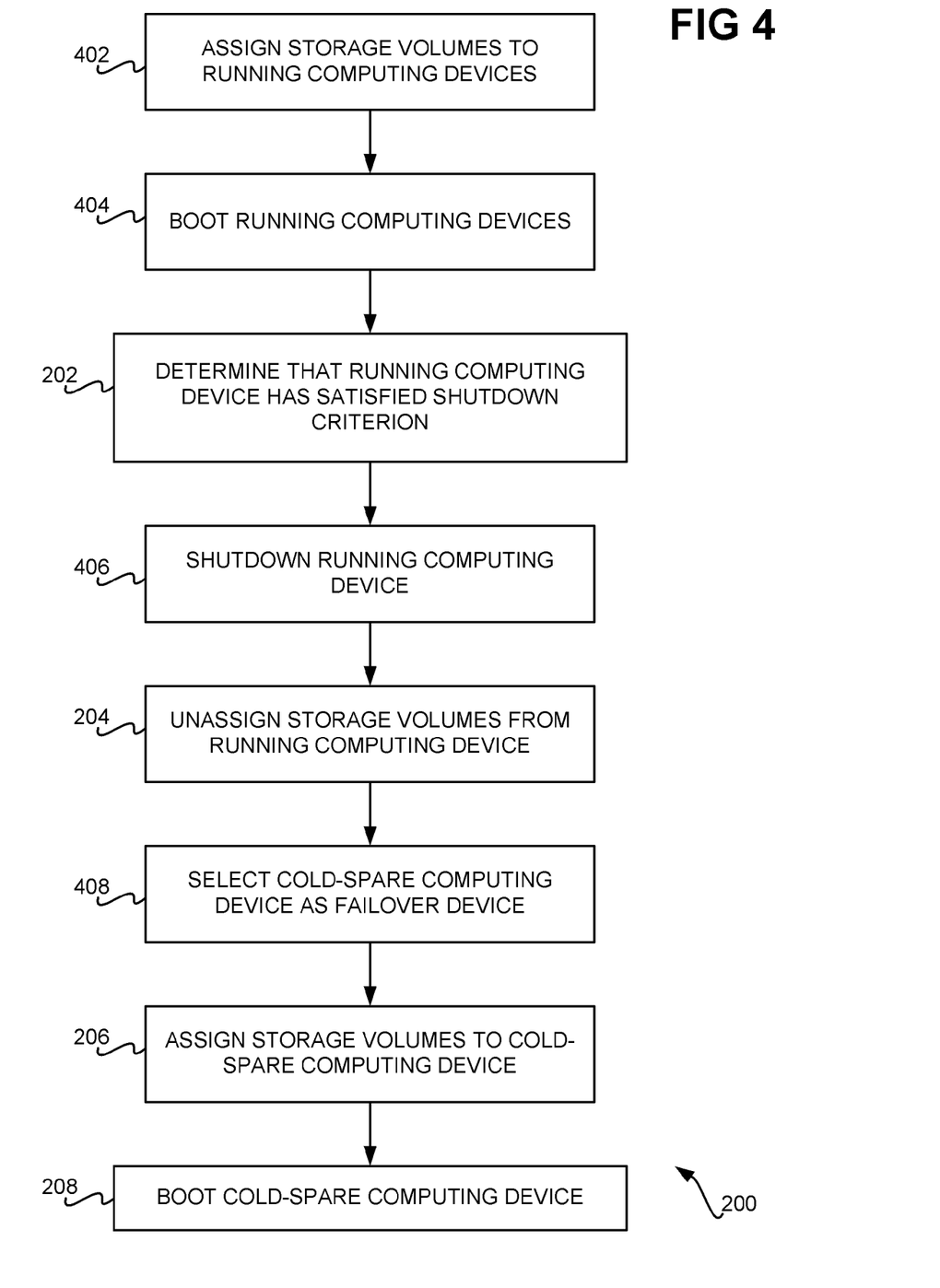
FIG. 4 is a flowchart of a method for performing computing device failover, and which is more detailed than but consistent with the method of FIG. 3, according to an embodiment of the invention.

FIG. 4 shows the method 200 for computing device failover that is more detailed than, but consistent with, the embodiment of FIG. 2, according to an embodiment of the invention. The method 200 may be performed by the management software 310 running on the server computing device 308, appropriately instructing the HBA's 304 of the computing devices 102 and the controller 306 of the SAN 106. Furthermore, some parts of the method 200 may be performed by the aforementioned failover script executed by the management software 310, as can be appreciated by those of ordinary skill within the art.

The storage volumes 108 of the SAN 106 are assigned to the computing devices 104 of the chassis 102 (402). If a given computing device is not assigned any of the storage volumes 108, then that computing device is a cold-spare computing device. In one embodiment, a cold-spare computing device may be considered as having a boot LUN, insofar as it is specified that the cold-spare computing device is to look for a LUN0, for instance, from which to boot when the cold-spare computing device is powered on. However, this boot LUN is not actually initially associated with the LUN of any particular storage volumes, as has been described. Each computing device that is to be a running computing device is assigned at least one of the storage volumes 108. A computing device is assigned the LUN of a storage volume from which it is to boot as the LUN0, or boot LUN, for the computing device. Any other storage volume having a LUN assigned to the computing device is an additionally assigned storage volume, and not the boot storage volume. In at least some embodiments, no storage volume may be concurrently assigned to more than one computing device.

The running computing devices are then booted from their assigned boot storage volumes (404). That is, these computing devices are each booted from the storage volume having a LUN with which the boot LUN for the computing device has been associated within a map stored in the controller 306. The computing devices then function as is normal. However, at some point, it is determined that a running computing device satisfies a shutdown criterion (202). As has been described, this can include the management software 310 receiving an event that the computing device in question will fail soon, that an administrator wishes to take the computing device offline to perform regular maintenance, and so on.

Thereafter, the running computing device in question is shutdown (406). All the storage volumes assigned to this computing device, and which include at least a boot storage volume, are unassigned from the computing device (408). This can be achieved, for instance, by the management software 310 running a failover script that instructs the controller 306 to perform the unassignment. Unassignment can include unassigning the LUN's of the storage volumes from the computing device in question.

A cold-spare computing device is then selected as the failover computing device to which the running computing device is to failover (408). If there is just one cold-spare computing device, then this device is selected. However, if there is more than one cold-spare computing device, the cold-spare computing device may be selected as the failover computing device in any conventional or other manner. For instance, a round-robin approach may be employed so that all the cold-spare computing devices are occasionally, used, and so that no single cold-spare computing device is overused.

As another example, the script may determine which of the computing devices have been designed as cold-spare computing devices, and proceed through the cold-spare computing devices until it locates once that has not been booted up yet. If all of the previously designated cold-spare computing devices have already been booted, then the script may notify a network administrator. For the purposes of this discussion, however, it is presumed that there is at least one available cold-spare computing device.

Thereafter, the storage volumes previously unassigned from the running computing device that has been shutdown are assigned to the cold-spare computing device (206). The management software 310 may be running a failover script that instructs the controller 306 to assign these storage volumes to the cold-spare computing device. For instance, the LUN's of the storage volumes may be assigned to the cold-spare computing device. The LUN of the storage volume from which the cold-spare computing device is to boot is particularly assigned to correspond to the boot LUN, or LUN0, of the cold-spare computing device.

Finally, the cold-spare computing device is booted from the storage volume from which the running computing device that has been shutdown previously booted (208). Failover is thus completed. The amount of downtime experienced by the user is minimal, insofar as the failover process is performed automatically without human intervention.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

We claim:

1. A method comprising:
   initially specifying a boot logical-unit number (LUN) for a cold-spare device, where the boot LUN is not initially associated with any particular LUN of a storage volume;
   assigning one or more storage volumes within a storage-area network (SAN) to a computing device, by assigning a LUN of each of the one or more storage volumes to the computing device, where the computing device references the LUN of one of the one or more storage volumes from which the computing device is to be booted as a boot LUN;
   booting the computing device from the one of the one or more storage volumes within the SAN;
   determining that the computing device to which the one or more storage volumes within the SAN have been assigned has satisfied a shutdown criterion;
   in response,
      unassigning the one or more storage volumes within the SAN from the computing device;
      assigning the one or more storage volumes within the SAN to the cold-spare computing device; and,
      booting the cold-spare computing device from the one of the one or more storage volumes within the SAN.

2. The method of claim 1, further comprising selecting the cold-spare computing device from one or more cold-spare computing devices that are not currently in use.

3. The method of claim 1, wherein unassigning the one or more storage volumes within the SAN from the computing device comprises unassigning the LUN of each of the one or more storage volumes within the SAN from the computing device, and wherein assigning the one or more storage volumes within the SAN to the cold-spare computing device comprises assigning the LUN of each of the one or more storage volumes within the SAN to the cold-spare computing device, where the cold-spare computing device references the LUN of the one of the one or more storage volumes from which the cold-spare computing device is to be booted as the boot LUN.

4. The method of claim 1, wherein determining that the computing device has satisfied the shutdown criterion comprises determining that the computing device is about to fail.

5. The method of claim 1, wherein determining that the computing device has satisfied the shutdown criterion comprises determining that the computing device is scheduled for shutdown to perform regular maintenance.

6. The method of claim 1, wherein the computing device and the cold-spare computing device are blade computing devices situated within one or more chassis and each has a host-bus adapter (HBA) communicatively coupled to a controller of the SAN.

7. The method of claim 1, wherein the computing device and the cold-spare computing device are separately enclosed computing devices.

8. The method of claim 1, wherein the method is performed by management software running on a server computing device.

9. A system comprising:
   a storage-area network (SAN) encompassing a plurality of storage devices over which a plurality of storage volumes are logically organized;
   a plurality of computing devices, each computing device categorized as one of a running computing device and a cold-spare computing device, each running computing device exclusively assigned to one or more of the storage volumes of the SAN, including a storage volume from which the running computing device is to boot;
   management software to monitor whether each of the running computing devices is to be shutdown, and in response to determining that one of the running computing devices is to be shutdown, to unassign the storage volumes from the one of the running computing devices, reassign the storage volumes to one of the cold-spare computing devices, and to boot the cold-spare computing device from one of the storage volumes,
   wherein each of the one or more of the storage volumes has a logical-unit number (LUN), and each said running computing device is exclusively assigned to one or more of the storage volumes of the SAN by LUN, where each said running computing device references the LUN of one of the one or more of the storage volumes from which the running computing device is to be booted as a boot LUN,
   and wherein each said cold-spare computing device has initially specified therefor a boot LUN that is not initially associated with any of the LUNs of the storage volumes within the SAN.

10. The system of claim 9, wherein the SAN comprises a controller that associates and unassociates the storage volumes to and from the computing devices responsive to the management software.

11. The system of claim 9, further comprising one or more chassis within which the computing devices are situated, the computing devices each comprising a blade computing device having a host-bus adapter (HBA) communicatively coupled to the SAN.

12. The system of claim 11, wherein the chassis comprise a first chassis within which the running computing devices are situated and a second chassis within which the cold-spare computing devices are situated.

13. The system of claim 9, wherein each said computing device is a separately enclosed computing device.

14. The system of claim 9, further comprising a server computing device on which the management software is run.

15. An article of manufacture comprising:
- a tangible recordable computer-readable data storage medium; and,
- means in the medium for initially specifying a boot logical-unit number (LUN) for a cold-spare computing device where the boot LUN is not initially associated with any particular LUN of a storage volume, for assigning a given storage volume within a storage-area network (SAN) to a computing device by assigning a LUN of the given storage volume to the computing device such that the computing device is to be booted from the given storage volume and references the LUN of the given storage volume as a boot LUN, for booting the computing device from the given storage volume within the SAN, for determining that the computing device that has been booted from the given storage volume of the SAN is to be shutdown, for unassigning the given storage volume from the computing device, for reassigning the given storage volume to the cold-spare computing device, and for booting the cold-spare computing device from the given storage volume.

* * * * *